US006383639B1

(12) United States Patent

Agata

(10) Patent No.: US 6,383,639 B1

(45) Date of Patent: May 7, 2002

(54) CHARGING MEMBER, ELECTROSTATIC LATENT IMAGE DEVELOPER USING THE SAME, IMAGE FORMING APPARATUS AND IMAGE FORMING METHOD

(75) Inventor: Takeshi Agata, Minami-Ashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/069,179

(22) Filed: Apr. 29, 1998

(30) Foreign Application Priority Data

May 6, 1997 (JP) ............................................ 9-115915

(51) Int. Cl.[7] ......................... B32B 15/02; B32B 17/02; B32B 19/00; B32B 21/02; B32B 23/02

(52) U.S. Cl. ...................... 428/407; 428/524; 428/35.7; 428/323

(58) Field of Search .............................. 430/106.6, 108, 430/904; 428/407, 524, 35.7, 36.91, 34.9, 35.4, 36.7; 492/53, 59

(56) References Cited

U.S. PATENT DOCUMENTS

| | | | | |
|---|---|---|---|---|
| 4,296,028 A | * 10/1981 | Moiso et al. | ............... | 260/160 |
| 4,906,741 A | * 3/1990 | Hazen et al. | ............... | 534/856 |
| 5,068,319 A | * 11/1991 | Brown et al. | ............... | 534/759 |
| 5,922,825 A | * 7/1999 | Sezi et al. | .................. | 528/191 |

FOREIGN PATENT DOCUMENTS

| | | | |
|---|---|---|---|
| JP | 49-51950 | | 5/1974 |
| JP | A-57-99653 | | 6/1982 |
| JP | A-60-19156 | | 1/1985 |
| JP | A-60-202451 | | 10/1985 |
| JP | A-61-110159 | | 5/1986 |
| JP | A-61-110160 | | 5/1986 |
| JP | A-62-121463 | | 6/1987 |
| JP | A-1-147478 | | 6/1989 |
| JP | A-3-46669 | | 2/1991 |
| JP | A-3-46670 | | 2/1991 |
| JP | A-3-46671 | | 2/1991 |
| JP | A-3-217857 | | 9/1991 |
| JP | A-3-219263 | | 9/1991 |
| JP | A-5-72818 | | 3/1993 |
| JP | 9-73176 | * | 3/1997 |
| JP | 10-171126 | * | 6/1998 |

* cited by examiner

*Primary Examiner*—Bruce H. Hess

*Assistant Examiner*—B. Shewareged

(74) *Attorney, Agent, or Firm*—Oliff & Berridge, P.C.

(57) ABSTRACT

Disclosed are a charging member comprising a resol-type phenol resin having a specific structural unit and a method for manufacturing the charging member and an electrostatic latent image developer, image forming apparatus, and image forming method using the charging member. The resol-type phenol resin is characterized by the fact that in that the structural unit contains, in particular, a $-[(CH_2)_pNR_1R_2]$ group directly bonded to an aromatic ring. The resol-type phenol resin exhibits high charging property and has excellent environmental stability and hence it can impart stable charge to a toner, whereby a high quality image in electrophotography can be maintained for a long period of time.

17 Claims, No Drawings

CHARGING MEMBER, ELECTROSTATIC LATENT IMAGE DEVELOPER USING THE SAME, IMAGE FORMING APPARATUS AND IMAGE FORMING METHOD

BACKGROUND OF THE INVENTION

1. Field of the Invention

The present invention relates to a charging member for developing an electrostatic latent image which is used to develop an electrostatic latent image formed by an electrostatic recording method in electrophotography, a method for manufacturing the charging member and an electrostatic latent image developer, image forming apparatus and image forming method using the charging member.

2. Description of the Related Art

When conventionally developing an electrostatic latent image formed by an electrostatic recording method, a charging member is used to impart an appropriate amount of positive or negative charge to a toner. Particularly in the case of using a two-component developer, a coated carrier coated with a resin which is the charging member is used. However, the use of the two-component developer causes problems such as a reduction in charge amount at high temperature and humidity, an extreme increase in charge amount at low temperature and humidity, and also gradual deterioration of charge controllability due to contamination of the surface of a carrier by toner components, e.g. a binder resin, charge controlling agent, and external additives. In order to solve such problems, a coated carrier is used in which the carrier is produced by coating a core material (hereinafter called "carrier core" or simply called "core" as the case may be) with such as a fluorine-based polymer, silicone-based polymer, silicone oil, which has a low surface energy, and is superior in environmental stability and surface contamination resistance to conventional materials. In recent years, carriers have been proposed which are coated with a fluorine-based polymer as disclosed in Japanese Patent Application Laid-Open (JP-A) Nos. 49-51950: 57-99653 and 60-202451; with a silicone-based polymer as disclosed in Japanese Patent Application Laid-Open (JP-A) Nos. 60-19156: 62-121463: 61-110159 and 61-110160; and with a resin containing silicone oil or the like as disclosed in Japanese Patent Application Laid-Open (JP-A) Nos. 3-46669: 3-46670: 3-46671 and 5-72814.

These carriers, however, require further improvements. They have insufficient adhesiveness to the carrier core, insufficient wear resistance of a resin coating layer, and show poor environmental stability due to large variations in the initial charge values and the spread of the charge distribution of a toner at high temperature and humidity or at a low temperature and humidity, particularly, due to reduction in charge amount at high temperature and humidity, or an extreme increase in the amount of charge at a low temperature and humidity. Carriers coated with an amide-type polymer are also proposed as described in Japanese Patent Application Laid-Open (JP-A) Nos. 3-217857 and 3-219263, but these carriers still require further improvements in environmental stability and charging properties since amino groups in the resin are used for the crosslinking reaction.

Further, a carrier produced by coating a core material with a phenol resin is used to improve the durability of the carrier. This carrier, however, has insufficient charging properties because a phenol resin with no substituent group is generally used.

On the other hand, as a developing sleeve, a metal sleeve such as aluminum and stainless steel (SUS) or an elastic sleeve such as silicone rubber, NBR and EPDM have been used.

However, control of initial charging of a toner is difficult due to the low charging ability of these developing sleeves themselves, and further, an amount of low charged toner or reversely polarized toner increase with the increase in the number of copies sheets due to the deterioration of the toner and contamination of the developing sleeve arising from long term use, thereby resulting in the easy occurrence of problems such as increase in fog or reduction of image density.

In order to solve these problems, many attempts have been made to increase the toner charge in the initial stage. For instance, the surface of the developing sleeve has been coated with a charge control material exhibiting charge with the polarity opposite to that of the toner. In order to assist the charging properties of a toner with a negative charge, trial methods in which the developing sleeve is coated with a resin exhibiting positive charging properties such as an acrylic resin and nylon resin and the like, or in which the developing sleeve is coated with the above mentioned resins or other resins having non-charging-properties, e.g. a phenol resin, containing a positive charge control agent such as a quaternary ammonium salt and the like, have been tried. Particularly the phenol resin has high mechanical strength, wear resistance and durability and is hence a desirable material to coat the developing sleeve therewith.

However, though these developing sleeves certainly assist in promoting the charging speed of the toner and in increasing the charge amount of the toner in the initial stage, the developing sleeves possess poor environmental stability, and problems such as reductions in image density and generation of ghost images due to excessive charge in the vicinity of the surface thereof and duplication of charged layers arise, especially at low temperature and humidity.

Further, when coating the developing sleeve with a phenol resin containing a positive charge control agent, neither durability nor environmental stability can be sufficiently imparted when only phenol resin is used, even if environmental stability is high.

An attempt to coat the surface of the developing sleeve with a silicone resin containing an aminosilane coupling agent is disclosed in Japanese Patent Application Laid-Open (JP-A) No. 1-147478. The attempt to coat the surface of the developing sleeve with a resin having a functional group containing a nitrogen atom such as an amino group is surely effective for increasing charge. However, reduction in charge amount may occur for extremely long term use even in thus method and thus such problems still has to be solve for obtaining a stable image quality.

SUMMARY OF THE INVENTION

The present invention has been achieved in view of the above drawbacks in prior art. An object of the present invention is to provide a highly durable charging member which ensures rapid charging, prevents a reduction in the charge amount at a high temperature and humidity, and prevents a extreme increase in the charge amount at a low temperature and humidity, provides a carrier capable of preventing a developer from deteriorating due to peeling of the coating from the core, and from deteriorating due to spent carrier caused by aging of the toner. The object also includes providing a method for manufacturing the charging member as well as providing an electrostatic latent image developer, an image forming apparatus and an image forming method each using the charging member. The present inventors have conducted extensive studies to solve the above problems, and found that these problems can be solved by using a phenol resin possessing the specific structure, shown below.

According to a first aspect of the present invention, there is provided a charging member comprising a resol-type phenol resin having at least one structural unit selected from the group consisting of structural units represented by the structural formulas (I) to (VIII):

(I)

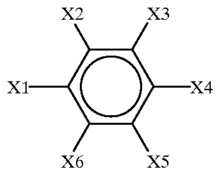

(II)

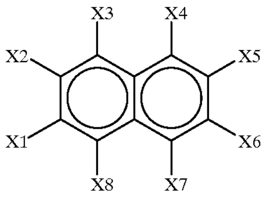

(III)

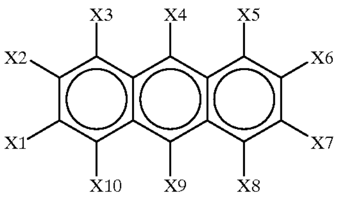

(IV)

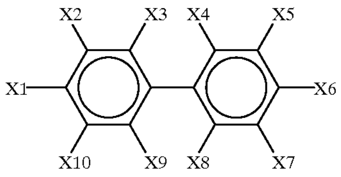

(V)

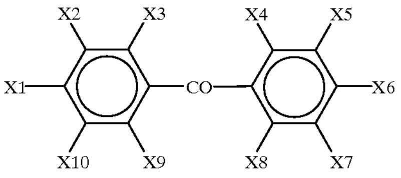

(VI)

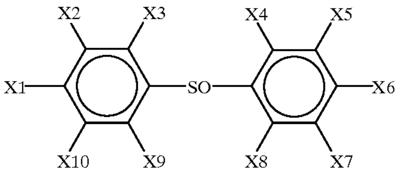

(VII)

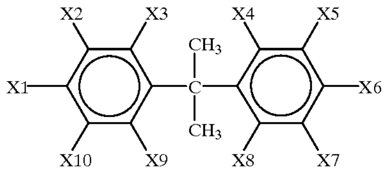

-continued (VIII)

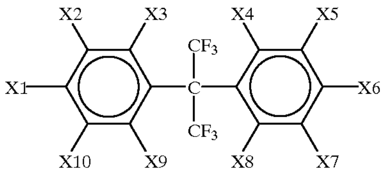

wherein X1 to X6 in the structural formula (I), X1 to X8 in the structural formula (II) or X1 to X10 in the structural formulas (III) to (VIII) represent at least two bonding groups, one or more OH groups, one to four $-[(CH_2)_pNR_1R_2]$ groups, the remainder represent a hydrogen atom, a halogen atom or an alkyl or an alkoxy group having 1 to 6 carbon atoms, wherein $R_1$ and $R_2$ each independently represents an alkyl group having 1 to 10 carbon atoms and p denotes an integer from 0 to 10.

According to another aspect of the present invention, there is provided a developing sleeve comprising a coating layer applied to the outer peripheral surface of a cylinder support, the coating layer composed of a charging member, on the outer peripheral surface of a cylindrical support, containing a resol-type phenol resin having at least one structural unit selected from the group consisting of structural units represented by the above structural formulas (I) to (VIII). According to a further aspect of the present invention, there is provided an electrostatic latent image developer comprising a toner and a carrier wherein the carrier is an electrostatic latent image developing carrier produced by coating the surface of a core material with a charging member including a resol-type phenol resin having at least one structural unit selected from the group consisting of structural units represented by the above structural formulas (I) to (VIII).

According to a still further aspect of the present invention, there is provided an image forming method comprising a step of forming an electrostatic latent image on an electrostatic latent image carrying member, a step of forming a developer layer on a developing sleeve and a step of developing the electrostatic latent image on the electrostatic latent image carrying member using the developer layer; wherein the developer consists of a toner and a carrier, wherein the carrier is an electrostatic latent image developing carrier produced by coating the surface of a core material with a charging member including a resol-type phenol resin having at least one structural unit selected from the group consisting of structural units represented by the above structural formulas (I) to (VIII).

According to a still further aspect of the present invention, there is an image forming method comprising a step of forming an electrostatic latent image on an electrostatic latent image carrying member, a step of forming a developer layer on a developing sleeve and a step of developing the electrostatic latent image on the electrostatic latent image carrying member using the developer layer, wherein the developing sleeve comprises a coating layer, on the outer peripheral surface of a cylinder support, composed of a charging member containing a resol-type phenol resin having at least one structural unit selected from the group consisting of structural units represented by the above structural formulas (I) to (VIII).

According to a still further aspect of the present invention, there is provided an image forming apparatus comprising a means of forming an electrostatic latent image on an electrostatic latent image carrying member, a means of forming a developer layer on a developing sleeve and a means of developing the electrostatic latent image on the electrostatic latent image carrying member using the developer layer, wherein the developing sleeve comprises a coating layer, on the outer peripheral surface of a cylindrical support, composed of a charging member containing a resol-type phenol resin having at least one structural unit selected from the group consisting of structural units represented by the above structural formulas (I) to (VIII). According to yet another aspect of the present invention, there is provided a method for manufacturing a charging member comprising a resol-type phenol resin having at least one structural unit selected from the group consisting of structural units represented by the above structural formulas (I) to (VIII) described below, wherein the charging member is produced by reacting at least one phenol derivatives selected from the group consisting of phenol derivatives represented by the structural formulas (IX) to (XVI) with formaldehyde or a material having the same effect as that of formaldehyde in an amount of 2 to 20 molar equivalents with respect to the phenol derivative and at a pH ranging from 8 to 12 in an aqueous ammonia or alkali hydroxide solution in an amount equivalent by mol to the number of hydroxyl groups of at least one phenol derivative:

(IX)

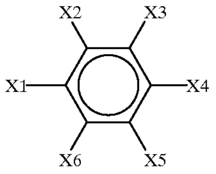

(X)

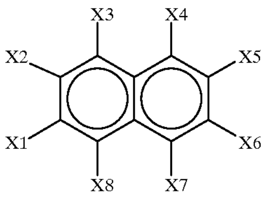

(XI)

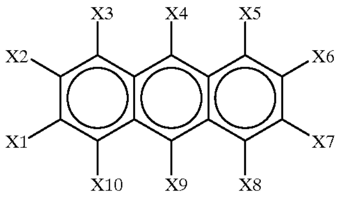

(XII)

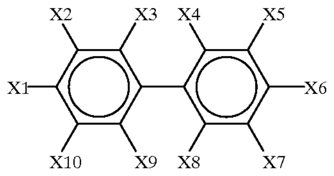

(XIII)

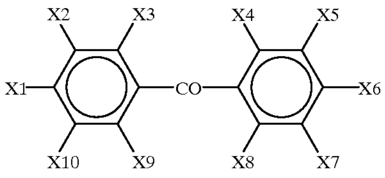

-continued (XIV)

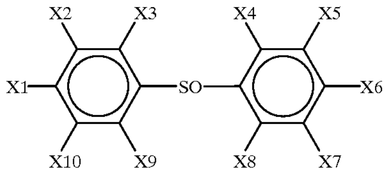

(XV)

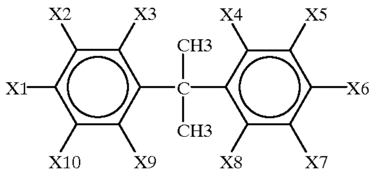

(XVI)

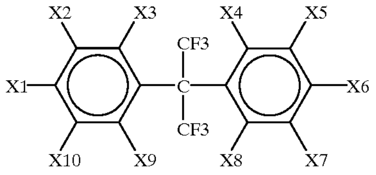

wherein X1 to X6 in the structural formula (IX), X1 to X8 in the structural formula (X) or X1 to X10 in the structural formulas (XI) to (XVI) represent one or more OH group, one to four —$[(CH_2)_pNR_1R_2]$ groups and the remainder represents a hydrogen atom, a halogen atom, or an alkyl or alkoxy group having 1 to 6 carbon atoms, $R_1$ and $R_2$ each independently represent an alkyl group having 1 to 10 carbon atoms and p denotes an integer from 0 to 10.

In the present invention, the charging member is a material imparting charge to a carrier for developing an electrostatic latent: image in a two-component developer, to a developing sleeve in either a two- or one-component system in a developing apparatus, and to a toner.

DESCRIPTION OF THE PREFERRED EMBODIMENTS

The present invention will now be explained in detail.

In the present invention, the resol-type phenol resin having at least one structural unit selected from the group consisting of structural units represented by the following formulas (I) to (VIII) possesses the structural features in which, particularly, the group —$[(CH_2)_pNR_1R_2]$ directly connected to an aromatic ring is contained in the structural unit. Therefore, the resin-type phenol resin has high charging imparting capability and excellent environmental stability whereby it can impart stable charge to the toner, thus enables to maintain an image of high quality even when used for a long period of time in electrophotography.

(I)

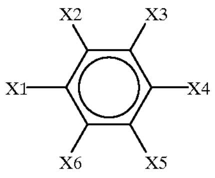

-continued (II)

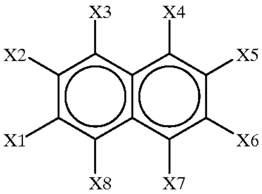

(III)

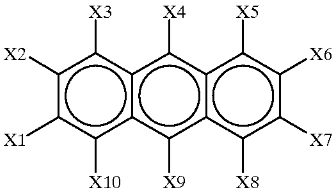

(IV)

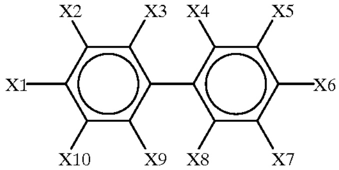

(V)

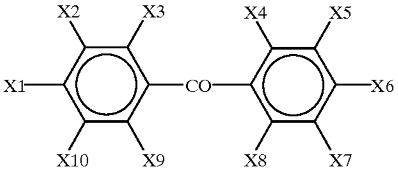

(VI)

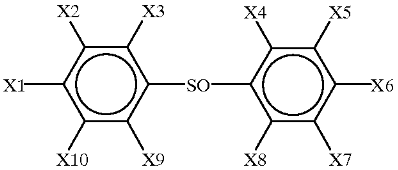

(VII)

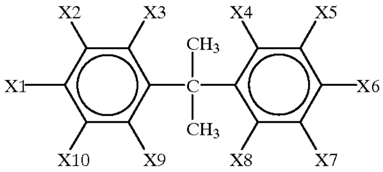

(VIII)

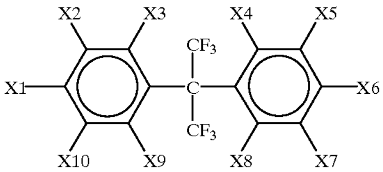

wherein X1 to X6 in the structural formula (I) X1 to X8 in the structural formula (II) or X1 to X10 in the structural formulas (III) to (VIII) represent at least two bonding groups, one or more OH groups, one to four —$[(CH_2)_pNR_1R_2]$ groups, the remainder represent a hydrogen atom, a halogen atom or an alkyl or an alkoxy group having 1 to 6 carbon atoms, wherein $R_1$ and $R_2$ each independently represents an alkyl group having 1 to 10 carbon atoms and p denotes an integer from 0 to 10.

The "bonding group" in the present invention is a moiety produced by the reaction of the phenol derivative described below with, for example, formaldehyde in the presence of an aqueous ammonia or alkali hydroxide. The moiety has primarily a formula of —$CH_2OH$, which reacts to impart thermosetting property.

These resol-type phenol resins in the present invention are compounds produced using at least one phenol derivative selected from the group consisting of phenol derivatives represented by the following structural formulas (IX) to (XVI):

(IX)

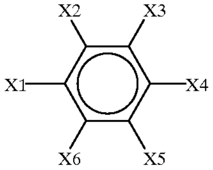

(X)

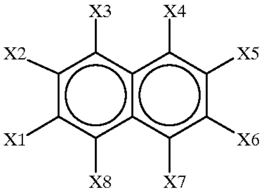

(XI)

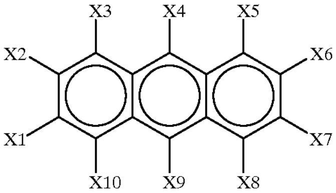

(XII)

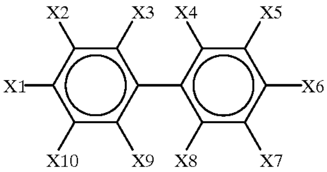

(XIII)

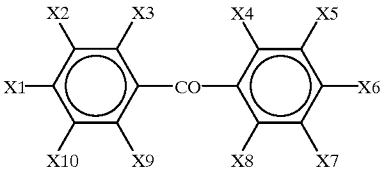

(XIV)

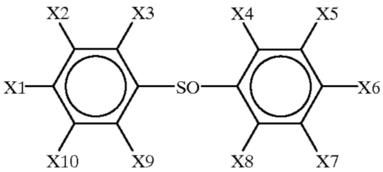

-continued

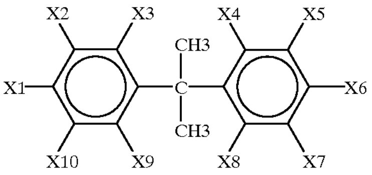

(XV)

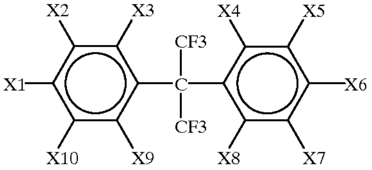

(XVI)

wherein X1 to X6 in the structural formula (I), X1 to in the structural formula (II) or X1 to X10 in the structural formulas (III) to (VIII) represent at least two bonding groups, one or more OH groups, one to four —$[(CH_2)_pNR_1R_2]$ groups, the remainder represent a hydrogen atom, halogen atom or an alkyl or an alkoxy group having 1 to 6 carbon atoms, wherein $R_1$ and $R_2$ each independently represents an alkyl group having 1 to 10 carbon atoms and p denotes an integer from 0 to 10.

Concrete examples of the phenol derivatives in the present invention are given below in Tables 1 to 10, but the compounds in the present invention are not limited by these examples:

TABLE 1

| Compound No. | Structural formula | X1 | X2 | X3 | X4 | X5 | X6 |
|---|---|---|---|---|---|---|---|
| 1 | 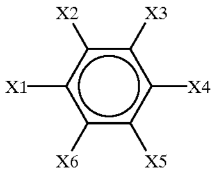 | OH | H | $N(CH_3)_2$ | H | H | H |
| 2 | 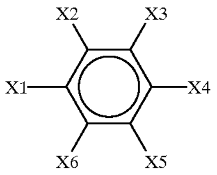 | OH | H | H | $N(CH_3)_2$ | H | H |
| 3 | 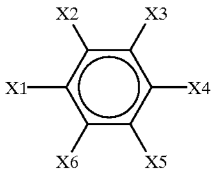 | OH | H | $N(C_2H_5)_2$ | H | H | H |
| 4 | 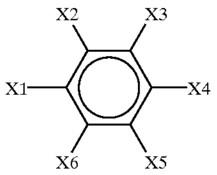 | OH | H | $N(C_8H_{17})_2$ | H | H | H |
| 5 | 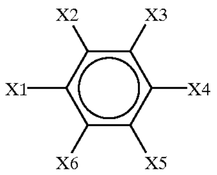 | OH | H | H | $CH_2N(CH_3)_2$ | H | H |

TABLE 2
| Compound No. | Structural formula | X1 | X2 | X3 | X4 | X5 | X6 |
|---|---|---|---|---|---|---|---|
| 6 | 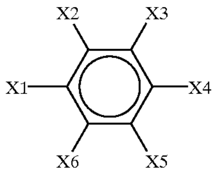 | OH | $N(CH_3)_2$ | H | OH | H | H |
| 7 | 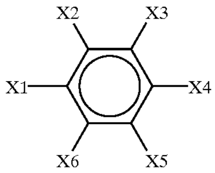 | OH | $N(C_8H_{17})_2$ | H | OH | H | H |
| 8 | 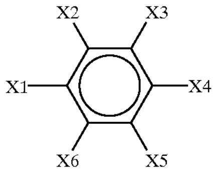 | OH | $N(CH_3)_2$ | OH | H | OH | H |
| 9 | 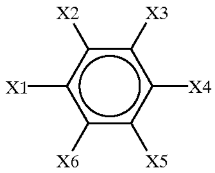 | OH | OH | OH | H | H | $N(CH_3)_2$ |
| 10 | 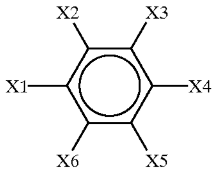 | OH | $CH_2N(CH_3)_2$ | H | $OC_2H_5$ | H | H |
TABLE 3
| Compound No. | Structural formula | X1 | X2 | X3 | X4 | X5 | X6 |
|---|---|---|---|---|---|---|---|
| 11 | 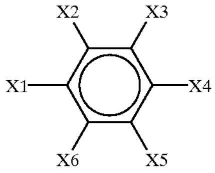 | OH | H | $N(CH_3)_2$ | Br | H | Br |
| 12 | 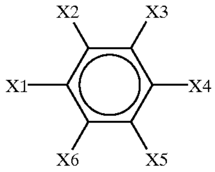 | OH | $CH_3$ | H | $N(CH_3)_2$ | $CH_3$ | H |

TABLE 3-continued
| Compound No. | Structural formula | X1 | X2 | X3 | X4 | X5 | X6 |
|---|---|---|---|---|---|---|---|
| 13 | 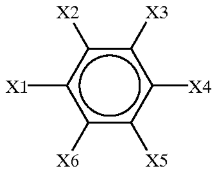 | OH | H | $N(C_8H_{17})_2$ | $OC_8H_{17}$ | H | H |
| 14 | 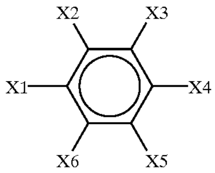 | OH | H | $CH_2N(CH_3)_2$ | OH | CH3 | H |
| 15 | 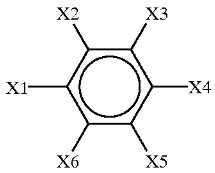 | OH | $C_2H_5$ | OH | H | CH3 | H |
TABLE 4
| Compound No. | Structural formula | X1 | X2 | X3 | X4 | X5 | X6 | X7 | X8 |
|---|---|---|---|---|---|---|---|---|---|
| 16 | 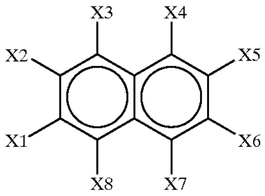 | OH | H | H | H | $N(CH_3)_2$ | H | H | H |
| 17 | 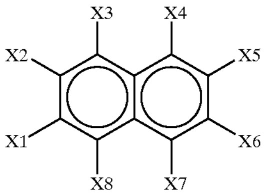 | H | OH | H | $N(CH_3)_2$ | H | OH | H | H |
| 18 | 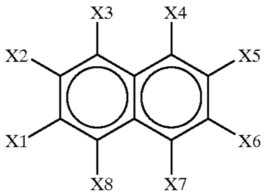 | OH | H | $CH_3$ | $CH_3$ | $OC_8H_{17}$ | OH | $N(C_2H_5)_2$ | H |

TABLE 4-continued
| Compound No. | Structural formula | X1 | X2 | X3 | X4 | X5 | X6 | X7 | X8 |
|---|---|---|---|---|---|---|---|---|---|
| 19 | 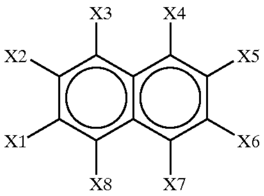 | OH | H | F | F | OH | H | $CH_2N(CH_3)2$ | F |
TABLE 5
| Compound No. | Structural formula | X1 | X2 | X3 | X4 | X5 | X6 | X7 | X8 | X9 | X10 |
|---|---|---|---|---|---|---|---|---|---|---|---|
| 20 | 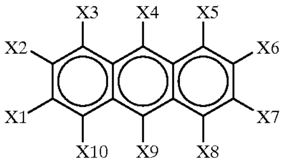 | CH | H | H | $N(CH_3)_2$ | H | OH | H | H | $N(CH_3)_2$ | H |
| 21 | 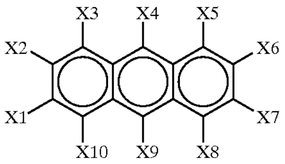 | $N(CH_3)_2$ | H | Br | OH | Br | H | H | H | OH | H |
| 22 | 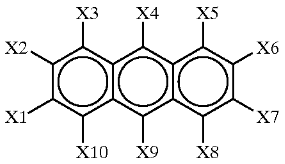 | $N(C_2H_5)_2$ | H | OH | $OC_8H_{17}$ | OH | H | $N(C_2H_5)_2$ | OH | H | OH |
| 23 | 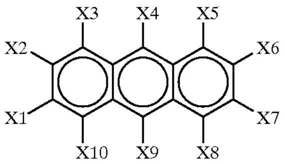 | OH | OH | $CH_2N(CH_3)_2$ | $CH_3$ | $CH_2N(CH_3)_2$ | H | H | H | $CH_3$ | H |

TABLE 6
| Compound No. | Structural formula | X1 | X2 | X3 | X4 | X5 | X6 | X7 | X8 | X9 | X10 |
|---|---|---|---|---|---|---|---|---|---|---|---|
| 24 | 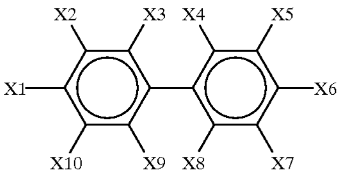 | OH | $N(CH_3)_2$ | H | H | $N(CH_3)_2$ | H | H | H | H | H |
| 25 | 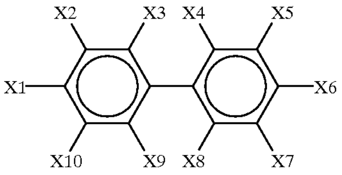 | OH | H | H | $N(CH_3)_2$ | H | OH | H | H | $N(CH_3)_2$ | H |
| 26 | 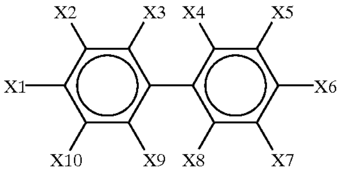 | OH | $CH_3$ | OH | $OC_8H_{17}$ | $N(C_2H_5)_2$ | OH | H | H | H | H |
| 27 | 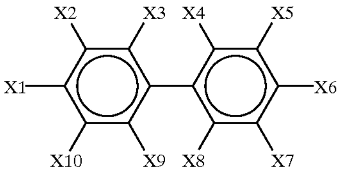 | OH | H | F | F | H | $CH_2N$(CH3)2 | H | F | F | H |
TABLE 7
| Compound No. | Structural formula | X1 | X2 | X3 | X4 | X5 | X6 | X7 | X8 | X9 | X10 |
|---|---|---|---|---|---|---|---|---|---|---|---|
| 28 | 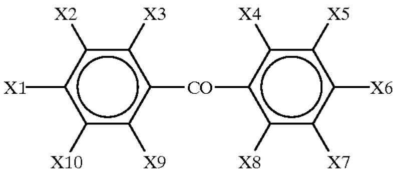 | OH | $N(CH_3)_2$ | H | H | $N(CH_3)_2$ | H | H | H | H | H |
| 29 | 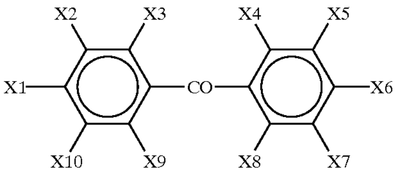 | OH | H | H | $N(CH_3)_2$ | H | OH | H | H | $N(CH_3)_2$ | H |

TABLE 7-continued
| Compound No. | Structural formula | X1 | X2 | X3 | X4 | X5 | X6 | X7 | X8 | X9 | X10 |
|---|---|---|---|---|---|---|---|---|---|---|---|
| 30 | 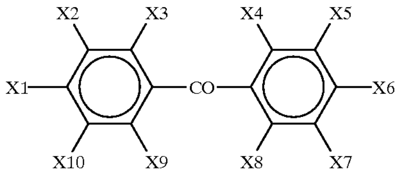 | OH | $CH_3$ | OH | $OC_8H_{17}$ | $N(C_2H_5)_2$ | OH | H | H | H | H |
| 31 | 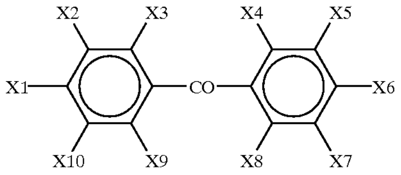 | OH | F | F | F | $CH_2N(CH3)2$ | OH | H | H | F | F |
TABLE 8
| Compound No. | Structural formula | X1 | X2 | X3 | X4 | X5 | X6 | X7 | X8 | X9 | X10 |
|---|---|---|---|---|---|---|---|---|---|---|---|
| 32 | 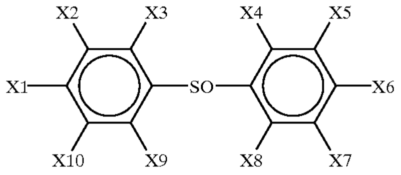 | OH | $N(CH_3)_2$ | H | H | $N(CH_3)_2$ | H | H | H | H | H |
| 33 | 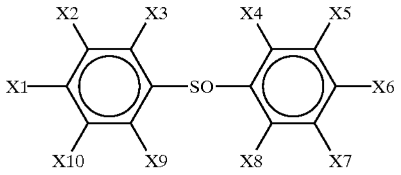 | OH | H | H | $N(CH_3)_2$ | H | OH | H | H | $N(CH_3)_2$ | H |
| 34 | 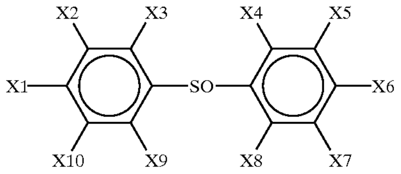 | OH | $CH_3$ | OH | $OC_8H_{17}$ | $N(C_2H_5)_2$ | OH | H | H | H | H |
| 35 | 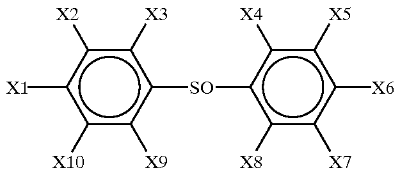 | OH | F | F | F | $CH_2N(CH_3)_2$ | OH | H | H | F | F |

TABLE 9
| Compound No. | Structural formula | X1 | X2 | X3 | X4 | X5 | X6 | X7 | X8 | X9 | X10 |
|---|---|---|---|---|---|---|---|---|---|---|---|
| 36 | 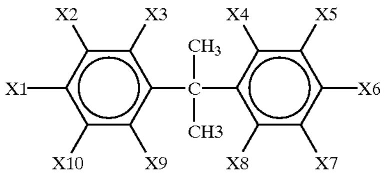 | OH | $N(CH_3)_2$ | H | H | H | H | H | H | H | H |
| 37 | 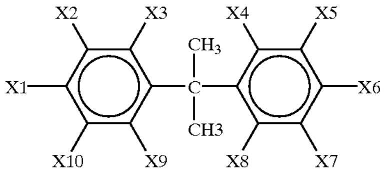 | OH | H | H | $N(CH_3)_2$ | H | OH | H | H | $N(CH_3)_2$ | H |
| 38 | 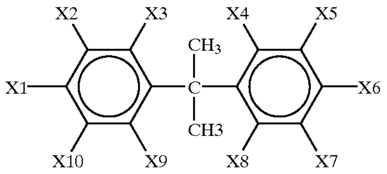 | OH | $CH_3$ | OH | $OC_8H_{11}$ | $N(C_2H_5)_2$ | OH | H | H | H | H |
| 39 | 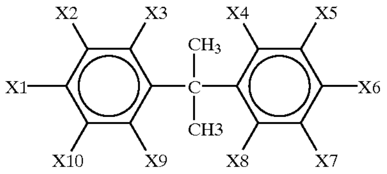 | OH | F | F | F | $CH_2N(CH_3)_2$ | OH | H | H | F | F |
TABLE 10
| Compound No. | Structural formula | X1 | X2 | X3 | X4 | X5 | X6 | X7 | X8 | X9 | X10 |
|---|---|---|---|---|---|---|---|---|---|---|---|
| 40 | 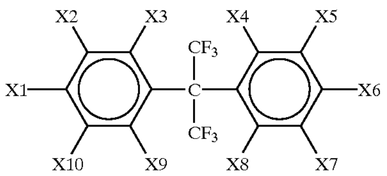 | OH | $N(CH_3)_2$ | H | H | H | H | H | H | H | H |
| 41 | 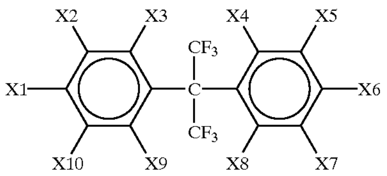 | OH | H | H | $N(CH_3)_2$ | H | OH | H | H | $N(CH_3)_2$ | H |

TABLE 10-continued

| Compound No. | Structural formula | X1 | X2 | X3 | X4 | X5 | X6 | X7 | X8 | X9 | X10 |
|---|---|---|---|---|---|---|---|---|---|---|---|
| 42 | 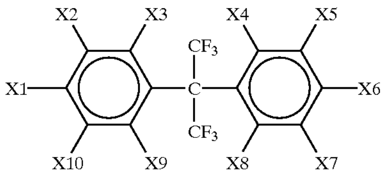 | OH | $CH_3$ | OH | $OC_8H_{17}$ | $N(C_2H_5)_2$ | OH | H | H | H | H |
| 43 | 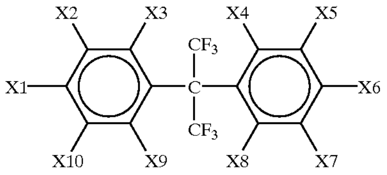 | OH | F | F | F | $CH_2N(CH_3)_2$ | OH | H | H | F | F |

In order to produce the resol-type phenol resin using these derivatives, it is necessary that the aromatic rings in the above structural formulas (IX) to (XVI) have 2 to 8 bonding groups to make hardening possible. That is, the structural unit of the resol-type phenol resin obtained by using, as the raw material, the phenol derivatives represented by the above structural formulas (IX) to (XVI) may be expressed by the following general formula (XVII):

$Z(CH_2OH)_y$General formula (XVII)

The above formula represents at least one structural unit selected from the group consisting of the structural units represented by the structural formulas (I) to (VIII) and y denotes an integer from 2 to 8.

In the present invention, a method of manufacturing the resol-type phenol resin using the above phenol derivative as the raw material is preferably the method described below.

At least one phenol derivative selected from the group consisting of phenol derivatives represented by the structural formulas (IX) to (XVI) is allowed to react with formaldehyde or another material having the same effect as that of formaldehyde in an excessive amount to that of the phenol derivative, preferably 2 to 20 molar equivalents, more preferably 4 to 10 molar equivalents in an aqueous ammonia or alkali hydroxide solution in an amount equivalent by mol to the number of hydroxyl groups of the phenol derivative.

This reaction is carried out in the aqueous medium while the pH is maintained in a range of from 8 to 12.

When the amount of formaldehyde is less than 2 molar equivalents, introduction of the bonding group will be insufficient and this may result in poor hardening in the heat curing step. On the contrary, when the amount of formaldehyde exceeds 20 molar equivalents, crosslinking proceeds during the reaction, thereby resulting in forming a gel-like material.

When the pH is less than 8, the addition reaction of the phenol derivatives with formaldehyde becomes difficult, whereas when the pH exceeds 12, phenolate anions are oxidized and coloration of products takes place.

In this case, the reaction temperature is preferably in the range of 60° C. to 80° C. When the temperature is less than 60° C., the resin producing reaction gets slow. When the temperature exceeds 80° C., crosslinking reaction proceeds rapidly and cause gelation.

Given as examples of the compound having the same effect as that of formaldehyde are paraformaldehyde, hexamethylenetetramine, formalin gas, and an aqueous formalin solution. Among these, paraformaldehyde, hexamethylenetetramine, and an aqueous formalin solution are particularly preferable in view of reactivity.

As examples of the alkali hydroxide used in the present invention in an equimolar amount with the number of hydroxyl groups of the above phenol derivative, sodium hydroxide, potassium hydroxide, and sodium carbonate are given.

After completion of the reaction, the required resol-type phenol resin is obtained by neutralization of the reaction solution. As examples of the aqueous medium used in the reaction, water, alcohols having 1 to 4 carbon atoms such as methyl alcohol and ethyl alcohol, and mixtures of these are preferable.

The electrostatic latent image developing carrier acting as the charging member of the present invention can be obtained when an appropriate core material is coated with the above resol-type phenol resin.

The above resol-type phenol resin as such a coating resin for the electrostatic latent image developing carrier is coated on the core material like powders of magnetic metals such as iron, copper, nickel and cobalt which have a volume average particle size of 10 to 150 μm or materials produced by dispersing these powders in a resin, and magnetic oxide powders such as magnetite and ferrite, or materials produced by dispersing these powders in a resin. The amount of the coating is generally 0.1 to 10.0% by weight, preferably 0.5 to 8.0% by weight with respect to the amount of the core. A resistance control agent such as carbon black, stannic oxide, or titanium oxide may be added to the coating layer to control resistance.

As a method for coating the core surface with the resol-type phenol resin prepared from the above phenol derivative as the raw material, known techniques such as a dipping method in which a core powder is dipped in a coating layer forming solution, a spraying method in which a coating layer forming solution is sprayed on the surface of a core, a fluidized bed method in which a coating layer forming solution is sprayed on a core material while the core material is floated in fluid air, or a kneader-coater method may be used. Further, it is necessary that the resol-type phenol resin component is hardened and crosslinked by heating after it is coated. The heating temperature at this time is preferably 100° C. to 200° C., more preferably 120° C. to 180° C. to harden the above resol-type phenol resin sufficiently.

The carrier obtained in this manner is mixed with a toner and used as a two-component developer. The toner can be obtained in the usual manner by melting and kneading a binder resin, a colorant and other additives, then cooling and pulverizing and finally by classifying if necessary.

Examples of the binding resin for the toner include monopolymers or copolymers of styrenes such as styrene and chlorostyrene; mono-olefins such as ethylene, propylene, butylene and isoprene; vinyl esters such as vinyl acetate, vinyl propionate, vinyl benzoate and vinyl acetate; α-methylene aliphatic monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone.

Typical examples of the binder resin are polystyrene, styrene-acrylate copolymer, styrene-methacrylate copolymer, styrene-acrylonitrile copolymer, styrene-butadiene copolymer, styrene-maleic anhydride copolymer, polyethylene and polypropylene as well as polyester, polyurethane, epoxy resin, silicone resin, polyamide, modified rosin, paraffin and waxes.

Typical examples of the coloring agent include carbon black, nigrosine, Aniline Blue, Chalcoyl Blue, Chrome Yellow, Ultramarine Blue, Dupont Oil Red, Quinoline Yellow, Methylene Blue Chloride, Phthalocyanine Blue, Malachite Green Oxalate, Lamp Black, Rose Bengale, C.I. Pigment·Red 48:1, C.I. Pigment Red·122, C.I. Pigment Red·57:1, C.I. Pigment·Yellow 97, C.I. Pigment·Yellow 12, C.I. Pigment·Blue 15:1 and C.I. Pigment·Blue 15:3.

Additives such as a known charge control agent and fixing adjuvant may be added to the toner as desired. The average particle size of the toner is 309 μm or less, preferably 4 to 20 μm.

The ratio of the toner, when the toner is mixed with the carrier to produce a developer, is preferably in the range of from 0.3 to 30% by weight of the total amount of the developer. Silica, alumina, tin oxide, strontium oxide, and a variety of resin powders, and conventionally known external additives may be added to improve the flowability of the developer.

A developing sleeve acting as the charging member can be obtained by coating the above resol-type phenol resin of the present invention on the outside surface of the cylindrical support to form the coating layer.

Conductive substrates, for examples, metals such as aluminum, stainless steel and insulating substrates, for example, ceramics and synthetic resins are given as the cylindrical support. Given as examples of the method for forming the above coating layer of the resol-type phenol resin on these cylindrical supports are a dipping method in which the substrate is dipped in a coating layer forming solution and a spraying method in which a coating layer forming solution is sprayed on the surface of a substrate. As the solvent used for the coating layer forming solution, any solvent may be used insofar as long as the above resol-type phenol resin dissolved in it. For example, toluene, tetrahydrofuran, dimethylformamide and chloroform may be used.

The film thickness of the coating layer of the developing sleeve acting as the charging member of the present invention is generally in a range of from 1 to 500 μm, preferably from 5 to 300 μm.

A resistance control agent such as carbon black, tin oxide and titanium oxide may be added to these coating layers to control the resistance.

In this case too, it is necessary to harden and crosslink the coating layer in the same manner as in the production of the aforementioned carrier. The heating temperature in this case is preferably 100° C. to 200° C. and more preferably 120° C. to 180° C. to harden the resol-type phenol resin sufficiently.

The developer layer regulating blade as acting the charging member of the present invention can be produced by applying the above resol-type phenol resin in the present invention to the surface of a blade substrate for regulating a developer layer. Given as examples of materials used as the substrate of the developer layer regulating blade are elastic materials such as rubbers, resins, and elastomers as well as materials similar to those of the developing sleeve.

The charging member of the present invention prepared in this manner may be used in an image forming method comprising a step of forming an electrostatic latent image on an electrostatic latent image carrying member, a step of forming a developer layer on a developing sleeve and a step of developing the electrostatic latent image on the electrostatic latent image support using the developer layer. In short, a developer using the carrier of the present invention as the charging member can be utilized as the above developer used in the aforementioned image forming method. Further, the above developing sleeve which is the charging member of the present invention can be utilized as the developing sleeve in an image forming appratus.

The image forming apparatus comprises a means of forming an electrostatic latent image on an electrostatic latent image support, a means of forming a developer layer on a developing sleeve and a means of developing the electrostatic latent image on the electrostatic latent image carrying member using the developer layer.

EXAMPLES

Synthetic Examples of a Resol-type Phenol Resin

The resol-type phenol resin of the present invention will be described by the following, but synthetic of the resol-type phenol resin of the present invention is not limited by these examples.

Synthetic Example 1

13.7 g (0.10 mol) of the No. 1 compound shown in the aforementioned Table 1 and 4.0 g (0.10 mol) of sodium hydroxide as the alkali hydroxide were dissolved in 40 ml of water stirring in a stream of nitrogen. 32.5 g of 37% aqueous formaldehyde solution (12.0 g (0.40 mol) as formaldehyde) was added to the aforementioned mixture at 20 to 30° C. The reaction solution was heated to 70 to 75° C. to react for 2 hours. The pH of the reaction solution was 10 to 11. As the reaction proceeded, a solid substance precipitated.

After the reaction was completed, 50 ml of water was added to the reaction solution and the pH of the solution was adjusted to 5 to 6 by addition of glacial acetic acid. The precipitated solid substance was collected by suction filtration, washed with water and dried at 30° C. using a vacuum drier. The dried solid substance was reprecipitated in tetrahydrofuran/n-hiexane and the precipitate was dried using a vacuum drier at 30° C. and 14.8 g of the desired resol-type phenol resin was obtained. The $C^{13}$NMR spectrum of the resulting phenol resin was measured. The presence of a —$CH_2OH$ bonding group was confirmed. The molecular weight which was measured by gel permeation chromatography (converted into a polystyrene gel) was 1,400 in terms of weight average molecular weight. In addition, the absorption peak of the substituted group acting as a dialkylamino group as was confirmed in the vicinity of 1350 $cm^{-1}$ by measurement using an infrared spectrophotometer.

Synthetic Example 2

The same reaction process as in Synthetic Example 1 was carried out except that 15.3 g (0.10 mol) of the No. 6 compound shown in Table 2 was used instead of the No. 1 compound used in Synthetic Example 1 and 11.2 g of (0.20 mol) potassium hydroxide acting as the alkali hydroxide and 24.3 g of 37% aqueous formaldehyde solution (9.0 g (0.30 mol) as formaldehyde), were used to obtain 11.5 g of the target resol-type phenol resin. The $C^{13}$NMR spectrum of the resulting phenol resin was measured. The presence of a —$CH_2OH$ bonding group was confirmed. The molecular weight which was measured by gel permeation chromatography (converted into a polystyrene gel) was 1,200 in terms of weight average molecular weight. In addition, the absorption peak of a dialkylamino group acting as the substituted group was confirmed in the vicinity of 1350 $cm^{-1}$ by measurement using an infrared spectrophotometer.

Synthetic Example 3

The same reaction process as in Synthetic Example 1 was carried out except that 20.3 g (0.10 mol) of the No. 17 compound shown in Table 4 was used instead of the No. 1 compound used in Synthetic Example 1 and 8.0 g of (0.20 mol) sodium hydroxide acting as the alkali hydroxide and 15.0 g of paraformaldehyde (15.0 g (0.50 mol) acting as formaldehyde) were used to obtain 17.5 g of the target resol-type phenol resin. The $C^{13}$NMR spectrum of the resulting phenol resin was measured and the presence of a —$CH_2OH$ bonding group are confirmed. The molecular weight which was measured by gel permeation chromatography (converted into a polystyrene gel) was 1,500 in terms of weight average molecular weight. In addition, the absorption peak of a dialkylamino group acting as the substituted group was confirmed in the vicinity of 1350 $cm^{-1}$ by measurement using an infrared spectrophotometer.

Synthetic Example 4

The same process as in Synthetic Example 1 was carried out except that 29.6 g (0.10 mol) of the No. 20 compound shown in Table 5 was used instead of the No. 1 compound used in Synthetic Example 1 and 12.1 g (0.20 mol) of 28% aqueous ammonia solution and 21.0 g of paraformaldehyde (21.0 g (0.70 mol) acting as formaldehyde) were used to obtain 22.5 g of the target resol-type phenol resin. The $C^{13}$NMR spectrum of the resulting phenol, resin was measured and the presence of a —$CH_2OH$ bonding group was confirmed. The molecular weight which was measured by gel permeation chromatography (converted into a polystyrene gel) was 800 in terms of weight average molecular weight. In addition, the absorption peak of a dialkylamino group acting as the substituted group was confirmed in the vicinity of 1350 $cm^{-1}$ by measurement using an infrared spectrophotometer.

Synthetic Example 5

The same reaction process as in synthetic Example 4 was carried out except that 27.2 g (0.10 mol) of the No. 25 compound shown in Table 6 was used instead of the No. 20 compound used in Synthetic Example 4 to obtain 29.5 g of the target resol-type phenol resin. The $C^{13}$NMR spectrum of the resulting phenol resin was measured and the presence of a —$CH_2OH$ bonding group was confirmed. The molecular weight which was measured by gel permeation chromatography (converted into a polystyrene gel) was 1,800 in terms of weight average molecular weight. In addition, the absorption peak of a dialkylamino group acting as the substituted group was confirmed in the vicinity of 1350 $cm^{-1}$ by measurement using an infrared spectrophotometer.

Synthetic Example 6

The same reaction process as in Synthetic Example 1 was carried out except that 42.2 g (0.10 mol) of the No. 41 compound shown in Table 10 was used instead of the No. 1 compound used in Synthetic Example 1 to obtain 45.5 g of the target resol-type phenol resin. The $C^{13}$NMR spectrum of the resulting phenol resin was measured and the presence of a —$CH_2OH$ bonding group was confirmed. The molecular weight which was measured by gel permeation chromatography (converted into a polystyrene gel) was 1,200 in terms of weight average molecular weight. In addition, the absorption peak of a dialkylamino group acting as the substituted group was confirmed in the vicinity of 1350 $cm^{-1}$ by measurement using an infrared spectrophotometer.

The present invention will be explained in detail by way of example.

Examples 1–4

Example 1

Carrier Production Example 1

The resol-type phenol resin prepared in Synthetic Example (1) was dissolved by adding tetrahydrofuran so that the proportion of solid phenol resin was 20% by weight. Then using Cu—Zn-type ferrite particles with an average particle size of 50 μm as the core material of a carrier, the above resol-type phenol resin solution was added to 100 parts by weight of the core material so that the solid content in the solution was 1.5 parts by weight, the mixture was further mixed at 50° C. for 30 minutes in a one liter miniature kneader equipped with a heater. Then the temperature was raised to 150° C., and the mixture was stirred for 40 minutes to carry out a coating operation. Next, the heater was turned off and the resulting product was cooled while being stirred to produce a coat carrier with a film thickness of 2 μm, which was then heat-treated at 120° C. for 2 hours and allowed to pass through a 75 μm screen sieve to obtain the targer carrier.

Example 2

Carrier Production Example 2

The resol-type phenol resin prepared in Synthetic Example (2) was dissolved in methyl ethyl ketone added so that the proportion of solid phenol resin was 20% by weight. Then using magnetite particles with an average particle size of 40 μm as the core material of a carrier, the above resol-type phenol resin solution was added to 100 parts by weight of the core material so that the solid content in the solution was 2.0 parts by weight. The mixture was processed at 100° C. for 30 minutes in a kneader-coater to carry out a coating operation and then hardening and crosslinking operations were performed at 160° C. for 30 minutes. Next, the heater was turned off, the resulting product was cooled while being stirred and allowed to pass through a 75 μm screen sieve to obtain a coat carrier with a film thickness of 2 μm.

Example 3

Carrier Production Example 3

The resol-type phenol resin prepared in Synthetic Example (3) was dissolved in methyl ethyl ketone added so that the proportion of solid phenol resin was 20% by weight. Then using magnetite particles with an average particle size of 50 μm as the core material of a carrier, the above resol-type phenol resin solution was added to 100 parts by weight of the core material so that the solid content in the solution was 1.5 parts by weight. The mixture was processed at 100° C. for 30 minutes in a kneader-coater to carry out a coating operation and then curing and crosslinking operations were performed at 160° C. for 30 minutes. Next, the heater was turned off, the resulting product was cooled while being stirred and allowed to pass through a 75 μm screen sieve to obtain a coat carrier with a film thickness of 2 μm.

Example 4

Carrier Production Example 4

The resol-type phenol resin prepared in Synthetic Example (4) was dissolved in methyl ethyl ketone added so that the proportion of solid phenol resin was 20% by weight. Carbon black particles (trademark: Vulcan XC72) with an average particle size of 0.25 μm were added to the mixture at 20% by weight per the amount of the resol-type phenol resin obtained in Synthetic Example (4) and dispersed for 20 minutes. Then using magnetite particles with an average particle size of 50 μm as the core material of a carrier, the above resol-type phenol resin solution was added to 100 parts by weight of the core material so that the solid content in the solution was 1.5 parts by weight. The mixture was processed at 100° C. for 30 minutes in a kneader-coater to carry out a coating operation and then hardening and crosslinking operations were performed at 160° C. for 30 minutes. Next, the heater was turned off, the resulting product was cooled while being stirred and allowed to pass through a 75 μm screen sieve to obtain a coat carrier with a film thickness of 2 μm.

Comparative Example 1

Comparative Carrier Production Example 1

Comparative Carrier Production Example 1 was performed in the same manner as Carrier Production Example 1 except that commercial phenol resin was used.

Comparative Example 2

Comparative Carrier Production Example 2

Comparative Carrier Production Example 2 was carried out in the same manner as in the Carrier Production Example 1 except that 4,4'-dihydroxy-2,3,5,6,2',3',5',6'-octabromodiphenylsulfon/cebasic acid copolymer (weight average molecular weight (Mw): 40,000 (value in gel permeation chromatography) was used as the polyester resin and the Cu—Zn-type ferrite particles with an average particle size of 50 μm used as the core were coated with 3-aminopropyltrimethoxysilane.

(Production of Toner)

Linear polyester resin (linear polyester obtained from terephthalic acid/bisphenol A ethylene oxide adduct/cyclohexane dimethanol, Tg=62° C., Mn=4,000, Mw=35,000, Acid Value: 12, Hydroxide value: 25)
100 parts by weight Magenta pigment (C.I. Pigment Red 57)
3 parts by weight The above-identified ingredients were blended in an extruder, then, pulverized by a jet mil. The resulting product was treated by a classifier utilizing an air current to obtain particles of magenta toner of $d_{50}$=8 μm.

(Production of Developer)

100 parts of each of the carriers prepared in the above Carrier Production Examples 1–4 and Comparative Carrier Production Examples 1 and 2 were mixed with 8 parts of the above magenta toner to produce developer to be used in Examples 1–4 and Comparative Examples 1-1.

(Test for Evaluation)

The resulting developer was given a continuous copying test in which 10,000 sheets were continuously copied by an electrophotographic copying machine (A-Color 630, manufactured by Fuji Xerox Co., Ltd.).

Evaluation items are as follows:

(1) Functional evaluation of an initial image at a intermediate temperature and humidity (23° C., 55% humidity)

(2) The charge amount of toner (μC/g) after 10 copies under three conditions: low temperature and humidity (10° C., 15% humidity), intermediate temperature and humidity and high temperature and humidity (28° C., 85% humidity)

(3) The charge amount of toner (μC/g) after 10,000 copies at intermediate temperature and humidity.

(4) observation of the condition of the carrier surface by means of an electron microscope after 10,000 copies at intermediate temperature and humidity.

The results are shown in Table 11. The charge amount of toner is indicated by a value calculated from image analysis according to CSG (Charge Spectrographiy).

TABLE 11

| | | Initial image | Charge amount of toner (μC/g) after 10 copies | | | Charge amount of toner (μC/g) after 10,000 copies | |
|---|---|---|---|---|---|---|---|
| | Type of carrier | (Intermediate temperature and humidity) | High temperature and humidity | Intermediate temperature and humidity | Low temperature and humidity | Intermediate temperature and humidity | Observation by electron microscope |
| Example 1 | Production of carrier Example 1 | Good without fog and density unevenness | −20.6 | −21.6 | −22.0 | −22.3 | No peeling, no adhesion |
| Example 2 | Production of carrier Example 2 | Good without fog and density unevenness | −21.0 | −22.7 | −23.2 | −21.0 | No peeling, no adhesion |
| Example 3 | Production of | Good without fog and | −19.5 | −20.5 | −21.2 | −20.1 | No peeling, no |

TABLE 11-continued

| | Type of carrier | Initial image (Intermediate temperature and humidity) | Charge amount of toner (μC/g) after 10 copies: High temperature and humidity | Intermediate temperature and humidity | Low temperature and humidity | Charge amount of toner (μC/g) after 10,000 copies: Intermediate temperature and humidity | Observation by electron microscope |
|---|---|---|---|---|---|---|---|
| | carrier Example 3 | density unevenness | | | | | adhesion |
| Example 4 | Production of carrier Example 4 | Good without fog and density unevenness | −18.0 | −19.0 | −20.2 | −21.1 | No peeling, no adhesion |
| Comparative Example 1 | Production of carrier Comparative Example 1 | Density unevenness occurred | −9.3 | −12.5 | −20.4 | −10.5 | Peeling occurred |
| Comparative Example 2 | Production of carrier Comparative Example 2 | Large density unevenness occurred | −4.3 | −6.0 | −9.0 | −2.0 | Peeling occurred |

As shown in Table 11, in the case of the developer using the carriers prepared in the Carrier Production Examples 1, 2, 3, and 4, images having no fog and no density unevenness were obtained. Furthermore, the image density was stable in the vicinity of 1.3. Toner charge was stable regardless of environmental variations. The carrier surface was observed by electron microscope to detect peeling of the carrier coating material after 10,000 copies. In the case of the developer using the carriers prepared in the Carrier Production Examples 1, 2, 3, and 4, no peeling of the carrier coating material was observed as shown in Table 11. Also, no adhesion of the external additives and toner components to the carrier surface was observed.

However, in the case of the developer using the carrier prepared in Comparative Carrier Production Example 1, large variations were caused by environmental changes. In the case of the developer using the carrier prepared in Comparative Carrier Production Example 2, the amount of toner charge decreased and was unstable against environmental variations. Furthermore, the amount of toner charge after 10,000 copies considerably decreased.

Observation of the surface of each of the carriers prepared in Carrier Production Comparative Examples 1 and 2 by electron microscope after 10,000 copies, showed that parts of the carrier surfaces were peeled off. Embedding of external additives and adhesion of toner components were also observed on the surface of the carrier.

Examples 5 and 6 and Comparative Examples 3 and 4

Example 5 (Developing sleeve production Example 1)

The resol-type phenol resin obtained in Synthetic Example (5) was dissolved in methyl ethyl ketone added so that the solid content of the phenol resin was 20% by weight. The resulting coating solution was applied to the surface of a developing roll sleeve (made of stainless steel) used for a laser printer (type: 4105, manufactured by Fuji Xerox Co., Ltd.) by a dipping coating method to form a coating layer so that the film thickness after drying was 2.5 μm. The coating layer was heated and hardened at 160° C. in a heating chamber for 30 minutes to obtain a developing sleeve.

Example 6 (Developing sleeve Production Example 2)

The resol-type phenol resin obtained in Synthetic Example (6) was dissolved in tetrahydrofuran added so that the solid content of the phenol resin was 20% by weight. To the mixture were added carbon black particles (trademark: Vulcan XC72) with an average particle size of 0.25 μm to act as the resistance control agent in an amount of 20% by weight with respect to the amount of the resol-type phenol resin obtained in Synthetic Example (4). The carbon black particles were dispersed for 20 minutes. The resulting coating solution was applied to the surface of a developing roll sleeve (made of stainless steel) of Fuji Xerox Co., Ltd laser printer (type: 4105) by a dipping coating method to form a coating layer so that the film thickness after drying was 2.5 μm. The coating layer was heated and hardened at 160° C. in a heating chamber for 30 minutes to obtain a developing sleeve.

Comparative Example 3

Comparative Developing Sleeve Production Example 1

In the production of Comparative Developing sleeve Production Example 1, a stainless steel developing roll sleeve of Fuji Xerox Co., Ltd laser printer (type: 4105) was used as it was.

Comparative Example 4

Comparative Developing Sleeve Production Example 2)

In the production of Comparative Developing sleeve Production Example 2, the same procedure as in the Developing sleeve Production Example 1 was carried out except that a commercial phenol resin was applied to the surface of a stainless steel developing roll sleeve of Fuji Xerox Co., Ltd. laser printer (type: 4105).

(Test for Evaluation)

Each of the sleeves obtained in the Developing sleeve Production Examples 1and 2 and Comparative Examples 1 and 2 was mounted on a modified laser printer 4105 manufactured by Fuji Xerox Co., Ltd. Using the magenta toner prepared in Example 1, an image evaluating test was carried out. As for the content for evaluation, the densities in solid portions and background stains at the initial stage and after 10,000 copies were evaluated by visual observation. As the results shown in table 12, the sleeves obtained in Developing sleeve Production Examples 1 and 2 produced good results.

TABLE 12

| | Type of developing sleeve | Initial stage: Density of solid portion | Initial stage: Stain on the back-ground | After 10,000 copies: Density of solid portion | After 10,000 copies: Stain on the back-ground |
|---|---|---|---|---|---|
| Example 5 | Production of developing sleeve Example 1 | Good | None | Good | Good |
| Example 6 | Production of developing sleeve Example 2 | Good | None | Good | Good |
| Comparative Example 3 | Production of developing sleeve Comparative Example 1 | Good | None | Good | Many |
| Comparative Example 4 | Production of developing sleeve Comparative Example 2 | Good | None | Low density | Observed |

As aforementioned, because the charging member of the present invention has the above structure, it ensures rapid charging, prevents reductions in the charge amount at high temperature and humidity and prevent extreme increases in the charge amount at low temperature and humidity. It provides a carrier capable of preventing deterioration of developer due to peeling off the coating layer from the core in the carrier. Deterioration caused by spent carrier which caused by aging of the toner does not occur and thus durability is high. The charging member of the present invention has excellent adhesion to the carrier core material, high wear resistance to the resin coating layer and can maintain high charging capability even when used continuously over a long period of time.

What is claimed is:

1. A charging material comprising a resol phenol resin having at least one structural unit selected from the group consisting of structural units represented by the structural formulas (I) to (VIII):

(I)

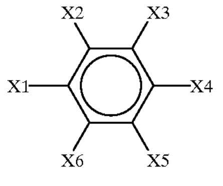

(II)

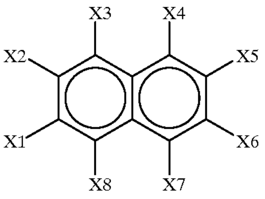

-continued (III)

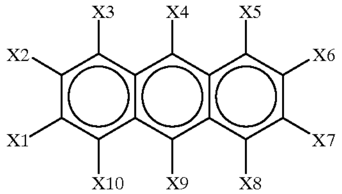

(IV)

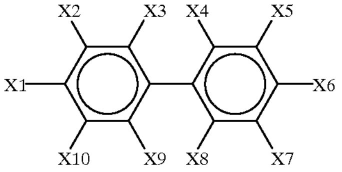

(V)

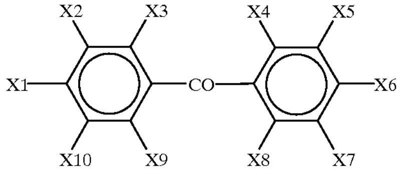

(VI)

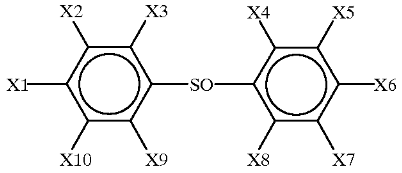

(VII)

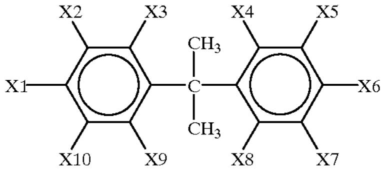

(VIII)

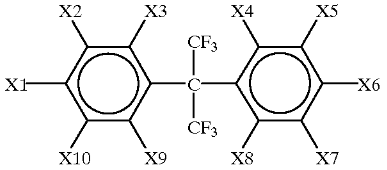

wherein X1 to X6 in the structural formula (I), X1 to X8 in the structural formula (II) or X1 to X10 in the structural formulas (III) to (VIII) represent: a) at least two bonding groups, wherein each said bonding group is a moiety produced by reacting a phenol derivative with formaldehyde, or a material having the same effect as formaldehyde, in the presence of an aqueous ammonia or alkali hydroxide, b) one or more OH groups, and c) one to four $-((CH_2)_pNR_1R_2)$ groups, wherein each remaining X group is selected from a group consisting of a hydrogen atom, a halogen atom, an alkyl group having 1 to 6 carbon atoms, and an alkoxy group having 1 to 6 carbon atoms, and wherein $R_1$ and $R_2$ each independently represent an alkyl group having 1 to 10 carbon atoms and p represents an integer from 0 to 10.

2. A charging material according to claim 1, wherein the charging material comprises said resol phenol resin coated on the surface of a core material of an electrostatic latent image developing carrier.

3. A charging material according to claim 2, wherein the volume average particle size of the core material is in the range of from 10 to 150 μm.

4. A charging material according to claim 2, wherein the amount of the coating of the resol phenol resin is 0.1 to 10.0% by weight with respect to the amount of the core material.

5. A charging material according to claim 1, wherein at least one of said at least two bonding groups in the structural formula has a —$CH_2OH$ structure.

6. A charging member comprising:

a supporting substrate; and a coating comprising the charging material of claim 19 over said supporting substrate.

7. A charging member comprising:

a supporting substrate; and a coating comprising the charging material of claim 5 over said supporting substrate.

8. A developing sleeve comprising a coating layer applied to the outer peripheral surface of a cylindrical support, the coating layer composed of a charging member containing a resol phenol resin having at least one structural unit selected from the group consisting of structural units represented by the structural formulas (I) to (VIII) described below:

(I)

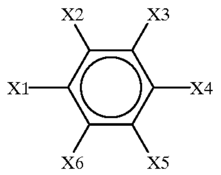

(II)

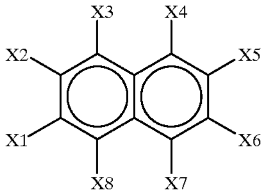

(III)

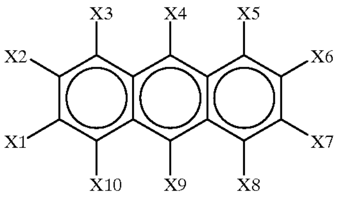

(IV)

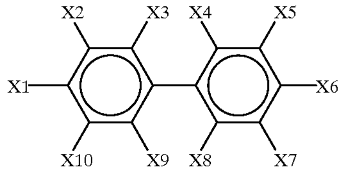

(V)

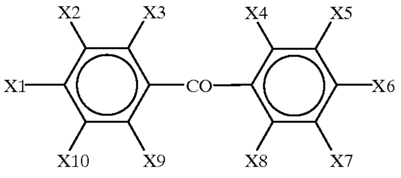

-continued (VI)

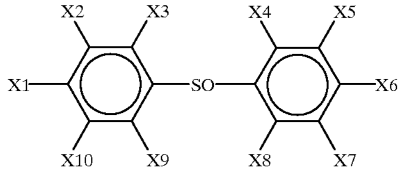

(VII)

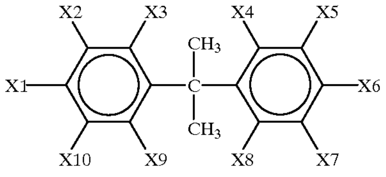

(VIII)

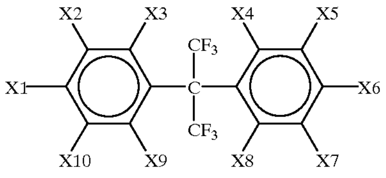

wherein X1 to X6 in the structural formula (I), X1 to X8 in the structural formula (II) or X1 to X10 in the structural formulas (II) to (VIII) represent: a) at least two bonding groups, wherein each said bonding group is a moiety produced by reacting a phenol derivative in the presence of an aqueous ammonia or alkali hydroxide, b) one or more OH groups, and c) one to four —$((CH_2)_pNR_1R_2)$ groups, and wherein each remaining X group is selected from the group consisting of a hydrogen atom, a halogen atom, an alkyl group having 1 to 6 carbon atoms, and an alkoxy group having 1 to 6 carbon atoms, and wherein $R_1$ and $R_2$ each independently represents an alkyl group having 1 to 10 carbon atoms and p denotes an integer from 0 to 10.

9. A developing sleeve according to claim 8, wherein the cylindrical support is selected from the group consisting of a metal, ceramics, and a synthetic resin.

10. A developing sleeve according to claim 8, wherein the cylindrical support is selected from the group consisting of a metal, ceramics, and a synthetic resin and a layer thickness of the coating layer is in the range of from 1 to 500 μm.

11. A developing sleeve according to claim 8, wherein a layer thickness of the coating layer is in the range from 1 to 500 μm.

12. An electrostatic latent image developer comprising a toner and a carrier wherein the carrier is an electrostatic latent image developing carrier produced by coating the surface of a core material with a charging member including a resol phenol resin having at least one structural unit selected from the group consisting of structural units represented by the structural formulas (I) to (VIII) described below:

(I)

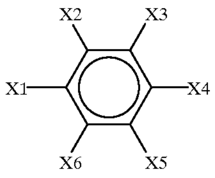

-continued (II)

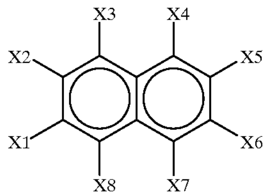

(III)

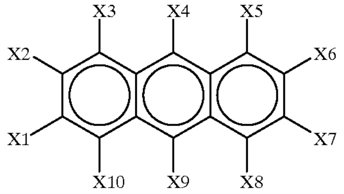

(IV)

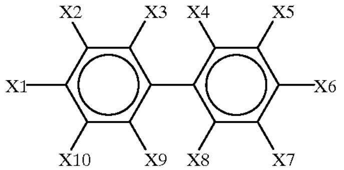

(V)

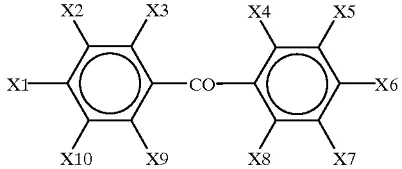

(VI)

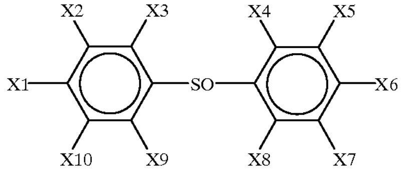

(VII)

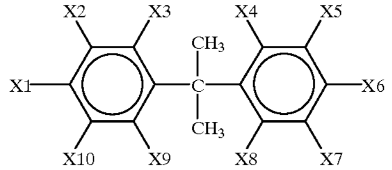

(VIII)

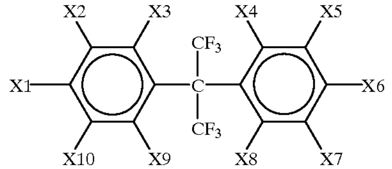

wherein X1 to X6 in the structural formula (I), X1 to X8 in the structural formula (II) or X1 to X10 in the structural formulas (III) to (VIII) represent: a) at least two bonding groups, wherein each said bonding group is a moiety produced by reacting a phenol derivative in the presence of an aqueous ammonia or alkali hydroxide, b) one or more OH groups, and c) one to four —$((CH_2)_pNR_1R_2)$ groups, and wherein each remaining X group is selected from the group consisting of a hydrogen atom, a halogen atom, an alkyl group having 1 to 6 carbon atoms, and an alkoxy group having 1 to 6 carbon atoms, and wherein $R_1$ and $R_2$ each independently represents an alkyl group having 1 to 10 carbon atoms and p denotes and integer from 1 to 10.

13. An electrostatic latent image developer according to claim 12, wherein coating amount of the resol phenol resin is in the range of from 0.1 to 10.0% by weight with respect to the amount of the core material.

14. An electrostatic latent image developer according to claim 12, wherein a volume average particle size of the core material of the carrier is in the range of from 10 to 150 μm.

15. A charging material according to claim 1, wherein the resol phenol resin is produced using at least one derivative selected from the group consisting of phenol derivatives represented by the structural formulas (IX) to (XVI):

(IX)

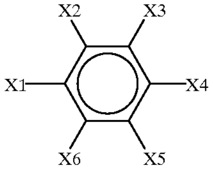

(X)

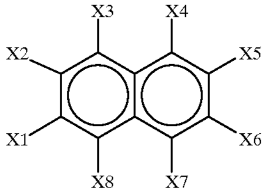

(XI)

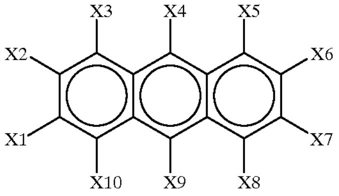

(XII)

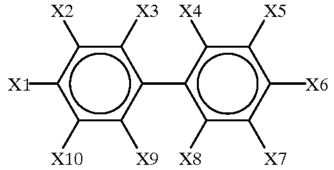

(XIII)

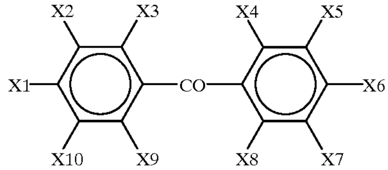

(XIV)

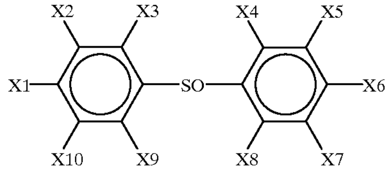

-continued (XV)

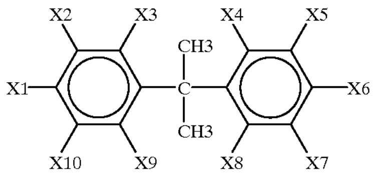

(XVI)

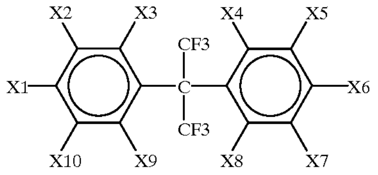

wherein X1 to X6 in the structural formula (IX), X1 to X8 in the structural formula (X) or X1 to X10 in the structural formulas (XI) to (XVI) represent: a) one or more OH groups, and b) one to four —($(CH_2)_pNR_1R_2$) groups, and wherein each remaining X group is selected from the group consisting of a hydrogen atom, a halogen atom, an alkyl group having 1 to 6 carbon atoms, and an alkoxy group having 1 to 6 carbon atoms, $R_1$ and $R_2$ each independently represent an alkyl group having 1 to 10 carbon atoms and p denotes an integer from 0 to 10.

16. A charging member comprising:

a supporting substrate; and a coating comprising the charging material of claim 15 over said supporting substrate.

17. An image forming apparatus comprising a means of forming an electrostatic latent image on an electrostatic latent image carrying member, a means of forming a developer layer on a developing sleeve and a means of developing the electrostatic latent image on the electrostatic latent image carrying member using the developer layer, wherein the developer sleeve comprises a coating layer, on the outer peripheral surface of a cylindrical support, composed of a charging member containing a resol phenol resin having at least one structural unit selected from the group consisting of structural units represented by the above structural formulas (I) to (VIII) described below:

(I)

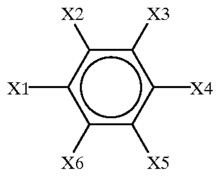

(II)

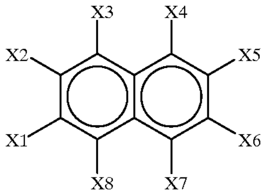

-continued (III)

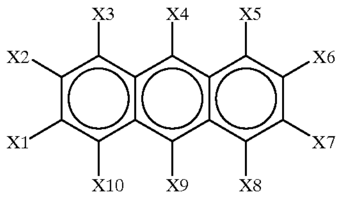

(IV)

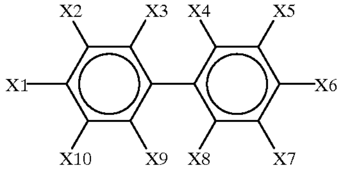

(V)

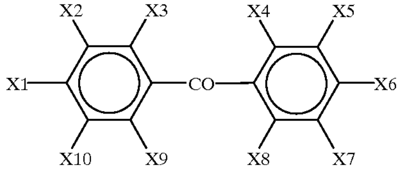

(VI)

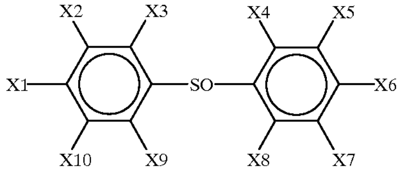

(VII)

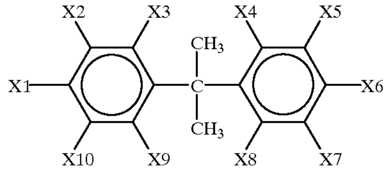

(VIII)

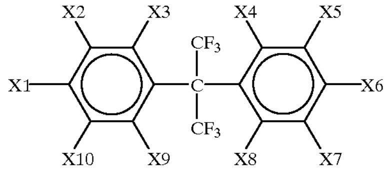

wherein X1 to X6 in the structural formula (I), X1 to X8 in the structural formula (II) or X1 to X10 in the structural formulas (III) to (VIII) represent: a) at least two bonding groups, wherein each said bonding group is a moiety produced by reacting a phenol derivative in the presence of an aqueous ammonia or alkali hydroxide, b) one or more OH groups, and c) one to four —($(CH_2)_pNR_1R_2$) groups, wherein each remaining X group is selected from the group consisting of a hydrogen atom, a halogen atom, an alkyl group having 1 to 6 carbon atoms, and an alkoxy group having 1 to 6 carbon atoms, wherein $R_1$ and $R_2$ each independently represents an alkyl group having 1 to 10 carbon atoms and p denotes and integer from 1 to 10.

* * * * *

UNITED STATES PATENT AND TRADEMARK OFFICE

CERTIFICATE OF CORRECTION

PATENT NO. : 6,383,639 B1

DATED : May 7, 2002

INVENTOR(S) : Takeshi Agata

It is certified that error appears in the above-identified patent and that said Letters Patent is hereby corrected as shown below:

Title page,
Item [56], References Cited, FOREIGN PATENT DOCUMENTS, change "JP A-5-72818" to -- JP A-5-72814 --.

Signed and Sealed this

Twenty-second Day of October, 2002

*Attest:*

JAMES E. ROGAN

*Attesting Officer* *Director of the United States Patent and Trademark Office*